United States Patent
Krishnapura (10) Patent No.: US 10,176,362 B1
(45) Date of Patent: Jan. 8, 2019

(54) SYSTEMS AND METHODS FOR A GRADIENT-BASED METRIC FOR SPOOF DETECTION

(71) Applicant: Synaptics Incorporated, San Jose, CA (US)

(72) Inventor: Rohini Krishnapura, Fremont, CA (US)

(73) Assignee: Synaptics Incorporated, San Jose, CA (US)

( * ) Notice: Subject to any disclaimer, the term of this patent is extended or adjusted under 35 U.S.C. 154(b) by 117 days.

(21) Appl. No.: 15/395,634

(22) Filed: Dec. 30, 2016

Related U.S. Application Data (60) Provisional application No. 62/420,485, filed on Nov. 10, 2016.

(51) Int. Cl.
  *G06K 9/00* (2006.01)
  *G06K 9/52* (2006.01)
  *G06K 9/46* (2006.01)

(52) U.S. Cl.
  CPC ..... *G06K 9/00087* (2013.01); *G06K 9/00899* (2013.01); *G06K 9/4642* (2013.01); *G06K 9/52* (2013.01)

(58) Field of Classification Search
  None
  See application file for complete search history.

(56) References Cited

U.S. PATENT DOCUMENTS

| | | | |
|---|---|---|---|
| 7,505,613 B2 | 3/2009 | Russo | |
| 2006/0147096 A1* | 7/2006 | Lee | G06K 9/00067 382/124 |
| 2007/0014443 A1* | 1/2007 | Russo | G06K 9/00114 382/124 |
| 2010/0131273 A1 | 5/2010 | Aley-Raz et al. | |
| 2014/0020090 A1* | 1/2014 | Nada | G06K 9/036 726/19 |
| 2014/0294262 A1 | 10/2014 | Schuckers et al. | |
| 2016/0070968 A1* | 3/2016 | Gu | G06K 9/00093 382/125 |

OTHER PUBLICATIONS

Dietmar Saupe, Lean domain pools for fractal image compression, SPIE 1996.*

Mair, et al. "Adaptive and Generic Corner Detection Based on the Accelerated Segment Test," Proceeding ECCV'10, Proceedings of the 11th European Conference on Computer Vision: Part II, Heraklion, Crete, Greece, pp. 183-196 (Sep. 5-11, 2010).

(Continued)

*Primary Examiner* — Mark Roz
(74) *Attorney, Agent, or Firm* — Leydig, Voit & Mayer, Ltd.

(57) ABSTRACT

A system and method for performing spoof detection are disclosed. The method includes: receiving an input image of a biometric; computing a gradient image of the biometric based on the input image of the biometric; dividing the gradient image into blocks of pixels; computing, for each block, a variance value corresponding to a variance of the pixels in the block; and, determining whether the input image is a replica of the biometric based on the variance values of the blocks of the gradient image.

20 Claims, 9 Drawing Sheets

(56) References Cited

OTHER PUBLICATIONS

Leutenegger, et al. "BRISK: Binary Robust Invariant Scalable Keypoints," 2011 IEEE International Conference on Computer Vision (ICCV) (Nov. 6-13, 2011).

Ojala, et al. "Multiresolution Gray Scale and Rotation Invariant Texture Classification with Local Binary Patterns," IEEE Transactions on Pattern Analysis and Machine Intelligence, vol. 24, Iss. 7, pp. 971-987 (Jul. 2002).

Dalal, et al. "Histograms of Oriented Gradients for Human Detection," IEEE Computer Society Conference on Computer Vision and Pattern Recognition 2005 (CVPR 2005) (Jun. 20-25, 2005).

Fisher, Bob. "Derivatives and Gradients" (Dec. 17, 1997) (available at: http://homepages.inf.ed.ac.uk/rbf/CVonline/LOCAL_COPIES/BASICMAT/node5.html).

Ghiani, et al. "Experimental Results on Fingerprint Liveness Detection," Proceeding AMDO '12, Proceedings of the 7th international conference on Articulated Motion and Deformable Objects, Mallorca, Spain, pp. 210-218 (Jul. 11-13, 2012).

Gottschlich, et al. "Fingerprint Liveness Detection based on Histograms of Invariant Gradients," 2014 IEEE International Joint Conference on Biometrics (IJCB) (Sep. 29-Oct. 2, 2014).

Wikipedia, "Image Gradient," as last modified on Sep. 15, 2016.

Pietikäinen, Matti. "Local Binary Patterns," Scholarpedia, vol. 5, No. 3 (2010).

Gragnaniello, et al. "An investigation of local descriptors for biometric spoofing detection," IEEE Transactions on Information Forensics and Security, vol. 10, Iss. 4, pp. 849-863 (2015).

Decann, et al. "A Novel Region Based Liveness Detection Approach for Fingerprint Scanners," Proceeding ICB '09, Proceedings of the Third International Conference on Advances in Biometrics, Alghero, Italy, pp. 627-636 (Jun. 2-5, 2009).

Ghiani, Luca, et al. "LivDet 2013 fingerprint liveness detection competition 2013." *2013 international Conference on Biometrics (ICB)*. IEEE. 2013.

Mura, Valerio, et al. "LivDet 2015 fingerprint liveness detection competition 2015." *Biometrics Theory, Applications and Systems (BTAS), 2015 IEEE 7th International Conference on*. IEEE, 2015.

\* cited by examiner

SYSTEMS AND METHODS FOR A GRADIENT-BASED METRIC FOR SPOOF DETECTION

CROSS-REFERENCE TO RELATED APPLICATIONS

This application claims the benefit of U.S. Provisional Application No. 62/420,485, filed on Nov. 10, 2016, which is hereby incorporated by reference in its entirety.

FIELD

This disclosure generally relates to biometric sensors and, more particularly, to systems and methods for a gradient-based metric for spoof detection.

BACKGROUND

Biometric authentication systems are used for authenticating and/or verifying users of devices incorporating the authentication systems. Biometric sensing technology provides a reliable, non-intrusive way to verify individual identity for recognition purposes.

Fingerprints, like various other biometric characteristics, are based on distinctive personal characteristics and, thus, are a reliable mechanism for recognizing an individual. There are many potential applications for utilization of fingerprint sensors. For example, fingerprint sensors may be used to provide access control in stationary applications, such as security checkpoints. Electronic fingerprint sensors may also be used to provide access control in mobile devices, such as cell phones, wearable smart devices (e.g., smart watches and activity trackers), tablet computers, personal data assistants (PDAs), navigation devices, and portable gaming devices. Accordingly, some applications, in particular applications related to mobile devices, may require authentication systems that are both small in size and highly reliable.

As used in the industry, biometric "spoofing" is any attempt to circumvent biometric security using a replica of a user's sensed biometric. In the context of fingerprint authentication systems, some examples of spoofing materials include three-dimensional (3D) gelatin molds of a finger, graphite and/or wood glue molds of a finger, and printed two-dimensional (2D) images of a finger, among others. In the context of facial recognition, an example spoofing material could be a photo of person's face. In the context of voice recognition, an example spoofing material could be a vocal imitation or playback.

As such, in order to maintain the integrity of biometric authentication systems, there is a need in the industry for anti-spoofing systems and methods, also referred to as "liveness detection" systems and methods, that can detect when an authentication attempt is a spoof and, upon spoof detection, properly deny authentication.

SUMMARY

Embodiments of the disclosure provide a method for spoof detection. The method includes: receiving an input image of a biometric; computing a gradient image of the biometric based on the input image of the biometric; dividing the gradient image into blocks of pixels; computing, for each block, a variance value corresponding to a variance of the pixels in the block; and, determining whether the input image is a replica of the biometric based on the variance values of the blocks of the gradient image. Some embodiments further include a non-transitory computer-readable storage medium storing instructions that, when executed by a processor, perform the method for spoof detection.

Another embodiment of the disclosure provides a device, comprising a biometric sensor and a processing system. The processing system is configured to: receive, from the biometric sensor, an input image of a biometric; compute a gradient image of the biometric based on the input image of the biometric; divide the gradient image into blocks of pixels; computing, for each block, a variance value corresponding to a variance of the pixels in the block; and, determine whether the input image is a replica of the biometric based on the variance values of the blocks of the gradient image.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description. Turning to the drawings, and as described in greater detail herein, embodiments provide systems and methods for a gradient-based metric for spoof detection.

Fingerprint images can have considerable variation from person to person, from sensor to sensor, and even from different images for the same person. This variation reflects the fact that a person's finger is a living thing and changes as the finger responds to external factors, such as sweating, stretching when touched, etc. When a finger is imaged with a fingerprint sensor, these changes are captured to some extent and, hence, the sensed images include some variation, even with different impressions of the same finger. Also, different sensors from the same sensing technology can add minute differences.

The goal of a robust fingerprint matcher is to be agnostic to many of these changes for the same finger, which improves the usability of the system for a genuine user. However, if spoofs are constructed, e.g., with latent prints from the user, the spoof images can be sufficiently similar to the real finger that they can be used to gain entry into the system. Fingerprint anti-spoof technology attempts to distinguish images from spoof fingers from those of live fingers by deriving properties from the images that can be used to differentiate them.

As described, anti-spoof technology helps to improve the security of a biometric authentication system by preventing a successful authentication using a spoofed fingerprint, for example a spoof fingerprint created using the latent fingerprint of a genuine user of the device. Since the spoof fingerprint is a copy of the fingerprint that is enrolled on the device, without anti-spoof technology, a fingerprint matcher could match the spoofed fingerprint image to an enrolled image and grant access to the device.

Anti-spoof technology analyzes features in the spoof fingerprint image and attempts to distinguish the spoof fingerprint image from an image of a real finger. Described embodiments provide a system and method for generating a gradient-based metric for spoof detection that increases spoof detection accuracy, and is image size independent. In some embodiments, the disclosed system and method can be applied directly to fingerprint ridges (as opposed to fingerprint valleys) to better distinguish between spoof fingerprints and real fingerprints.

As described in greater detail herein, embodiments provide a gradient-based spoof detection metric that uses a histogram of variance of a plurality of histograms of gradients, where each histogram of gradients corresponds to a different portion of an image, e.g., an 8×8 pixel block. The disclosed gradient-based metric provides a unique approach to spoof detection that indentifies minute changes in the gradient direction due to imperfections resulting from the spoofing material. The use of a histogram variance increases spoof detection accuracy and additionally makes the feature derived from the disclosed metric generic to image size.

Once the gradient-based spoof detection metric is computed, the metric is input to a "classifier," which produces a score that can be compared against a threshold to determine if the finger is a live finger or a spoof. In some implementations, many different metrics are input into the classifier, and the classifier is configured to compute an overall liveness score based on the combination of metrics. In one example, the classifier is a neural network, but any classifier is within the scope of the disclosure. In one embodiment, the classifier itself can be developed using machine learning methods, where a training set and a test set are created to train and validate the classifier performance. In other embodiments, the classifier can be created without machine learning, but using any other kind of decision function.

Software-based anti-spoof technology detects spoofs by extracting features in an input image and analyzing those features to distinguish a spoof image from an image of a real finger. Typically, anti-spoof solutions are performed independent of the underlying matcher (i.e., the matcher that is used to determine whether the input image provides a match to an enrollment template for purposes of authentication, verification, or identification, for example), such that a match/non-match decision and a spoof/non-spoof decision are made separately and independently of one another.

Figure 1:
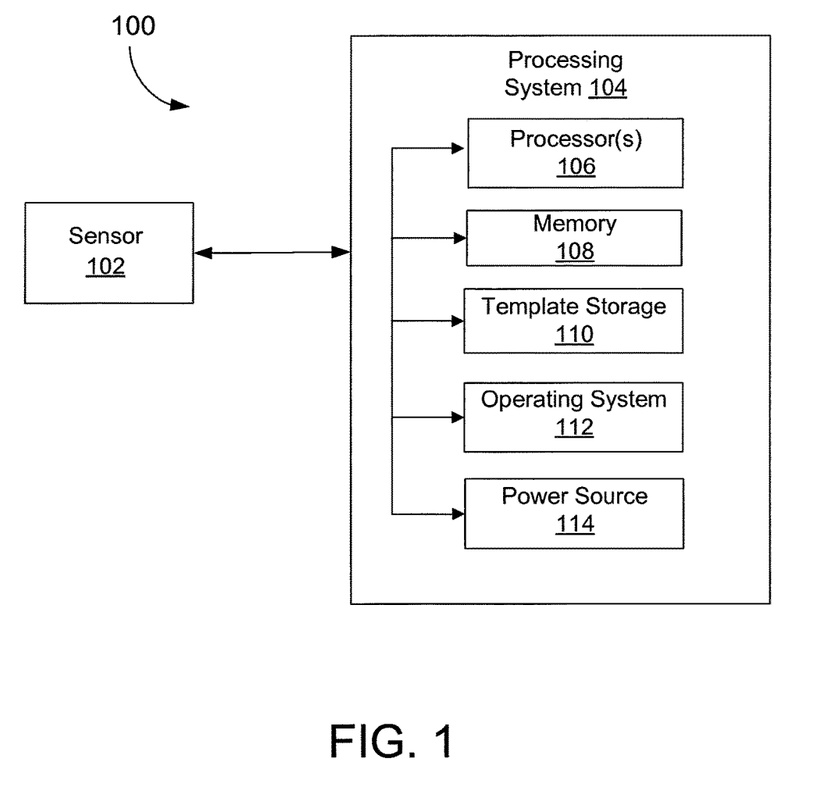
FIG. 1 is a block diagram of an example of a device that includes an optical sensor and a processing system according to an embodiment.

Turning to the figures, FIG. 1 is a block diagram of an example of an electronic device 100 that includes a sensor device 102 (i.e., biometric sensor device) and a processing system 104, according to an embodiment. By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store information extracted from views for fingerprint images for a user's fingerprint or other enrollment/verification information. In some embodiments, verification views can also be stored in the template storage 110, for example, with template-update mechanisms. In some embodiments, the enrollment views may not be explicitly stored in the template storage 110, but rather some other information extracted from the enrollment views is stored that does not contain the original enrollment views themselves. In other embodiments, the enrollment views may be explicitly stored in the template storage 110. The enrollment views can include multiple images of the same finger. Further, the enrollment views can include view of multiple different fingers of the user. More generally, the template storage 110 may be used to store information about an object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108 and template storage 110. The processing system 104, although shown as including a processor 106 and memory 108, may further include a microprocessor, microcontroller and/or dedicated circuitry.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Sensor device 102 can be implemented as a physical part of the electronic device 100, or can be physically separate from the electronic device 100. As appropriate, the sensor device 102 may communicate with parts of the electronic device 100 using any one or more of the following: buses, networks, and other wired or wireless interconnections. In some embodiments, sensor device 102 is implemented as a fingerprint sensor to capture a fingerprint image of a user. In accordance with the disclosure, the optical sensor device 102 uses optical sensing for the purpose of object imaging including imaging biometrics such as fingerprints. The sensor device 102 can be incorporated as part of a display, for example, or may be a discrete sensor. In some embodiments, the sensor device 102 may perform optical imaging. In various other embodiments, the sensor device 102 can be replaced with a capacitive sensor device, ultrasonic sensor device, or another sensor device that uses some other sensing technology for object imaging, as described in greater detail herein.

The electronic device 100 may utilize any suitable combination of sensor components and sensing technologies to detect user input in the sensing region. Some implementations utilize arrays or other regular or irregular patterns of multiple sensing elements to detect the input. Example sensing techniques that the electronic device 100 may use include capacitive sensing techniques, optical sensing techniques, acoustic (e.g., ultrasonic) sensing techniques, pressure-based (e.g., piezoelectric) sensing techniques, resistive sensing techniques, thermal sensing techniques, inductive sensing techniques, elastive sensing techniques, magnetic sensing techniques, and/or radar sensing techniques.

For example, the electronic device 100 may use resistive sensing techniques where contact from an input object closes an electrical circuit and can be used to detect input. In one example technique, the sensor device 102 includes a flexible and conductive first layer separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine spatial information corresponding to the input object.

In another example, the electronic device 100 may use inductive sensing techniques where one or more sensing elements pick up loop currents induced by a resonating coil or pair of coils. Some combination of the magnitude, phase, and frequency of the currents may then be used to determine spatial information corresponding to the input object.

In another example, the electronic device 100 may use acoustic sensing techniques where one or more acoustic sensing elements detect sound waves from nearby input objects. The sound waves may be in audible frequencies or ultrasonic frequencies. The detected sound waves may include echoes of ambient sound waves and/or echoes of sound waves emitted by the input device that are reflected from surfaces of the input object. Some combination of the amplitude, phase, frequency, and or time delay of the electrical signals may be used to determine spatial information corresponding to the input object.

One example acoustic sensing technique utilizes active ultrasonic sensing to emit high frequency source waves that propagate to the sensing region. One or more ultrasonic transmitter elements (also "ultrasonic emitters") may be used to emit high frequency sound waves to the sensing region, and one or more ultrasonic receiving elements (also "ultrasonic receivers") may detect echoes of the emitted sound waves. Separate elements may be used to transmit and receive, or common elements that both transmit and receive may be used (e.g., ultrasonic transceivers). In some instances, emitted ultrasonic waves are able to penetrate sub-surfaces of the input object, such as dermal layers of a human finger.

In another example, the electronic device 100 may use optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, CMOS image sensor arrays, CCD arrays, thin-film detectors, and other suitable photosensors sensitive to light in wavelength(s) of interest. Active illumination may be used to provide light to the sensing region, and reflections from the sensing region in the illumination wavelength(s) may be detected to determine input information corresponding to the input object.

One example optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another example optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to scatter and partially transmit across this interface at the region of contact by the input object. An example of this is presence of a finger introduced to an input surface defined by a glass to air interface. The higher refractive index of human skin compared to air causes light incident at the input surface at the critical angle of the interface to air to be partially transmitted across the input interface and scattered by the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

In another example, the electronic device 100 may use capacitive techniques where voltage or current is applied to create an electric field. Nearby input objects cause changes in the electric field, and produce detectable changes in capacitive coupling that may be detected as changes in voltage, current, or the like. Sensor electrodes may be utilized as capacitive sensing elements. Arrays or other regular or irregular patterns of capacitive sensing elements may be used to create electric fields. Separate sensor electrodes may be ohmically shorted together to form larger sensing elements.

One example technique utilizes "self capacitance" (or "absolute capacitance") sensing methods based on changes in the capacitive coupling between sensor electrodes and an input object. An input object near the sensor electrodes alters the electric field near the sensor electrodes, thus changing the measured capacitive coupling. An absolute capacitance sensing method may operate by modulating sensor electrodes with respect to a reference voltage (e.g. system ground), and by detecting the capacitive coupling between the sensor electrodes and the input object. For example, the sensing element array may be modulated, or a drive ring or other conductive element that is ohmically or capacitively coupled to the input object may be modulated. The reference voltage may by a substantially constant voltage or a varying voltage, or the reference voltage may be system ground.

Another example technique utilizes "mutual capacitance" (or "transcapacitance") sensing methods based on changes in the capacitive coupling between sensor electrodes. An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive. Also, sensor electrodes may be dedicated transcapacitance sensing elements or absolute capacitance sensing elements, or may be operated as both transcapacitance and absolute capacitance sensing elements.

Some non-limiting examples of electronic devices 100 include personal computers of all sizes and shapes, such as desktop computers, laptop computers, netbook computers, tablets, web browsers, e-book readers, and personal digital assistants (PDAs). Additional example electronic devices 100 include composite input devices, such as physical keyboards and separate joysticks or key switches. Further example electronic devices 100 include peripherals such as data input devices (including remote controls and mice) and data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras). Still further examples include vehicles, firearms, and other devices that may require to be locked or need authentication.

Figure 2:
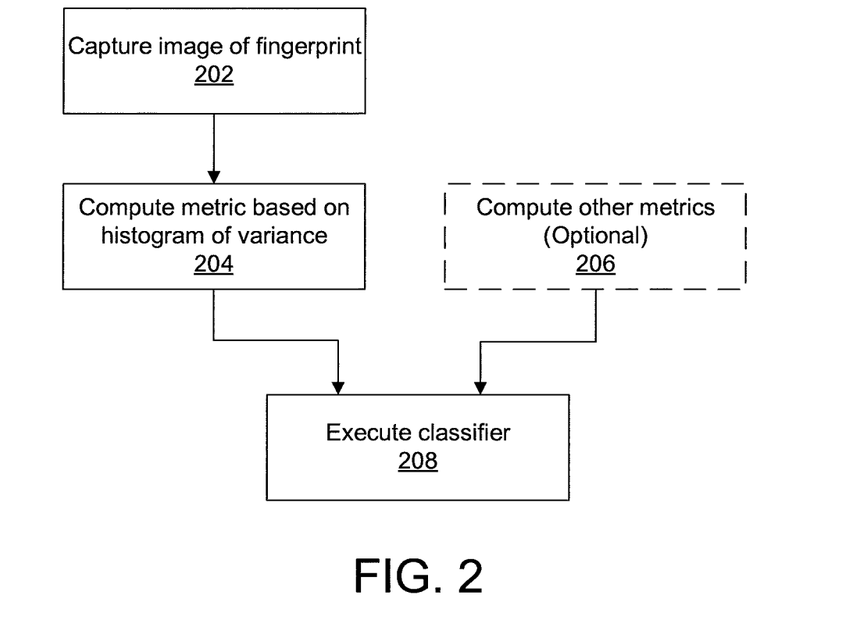
FIG. 2 is a block diagram illustrating a system and method for spoof detection involving a metric based on a histogram of variance according to an embodiment.

FIG. 2 is a block diagram illustrating a system and method for spoof detection involving a metric based on a histogram of variance according to an embodiment. At step 202, a sensor captures an image of a fingerprint. The fingerprint can be either from a live finger or a spoofed finger. At step 204, a processor computes a metric based on a histogram of variance, as described in greater detail herein. The metric computed at step 204 is passed to a classifier. Optionally, at step 206, the processor may compute other spoof detection metrics and also pass them to the classifier. At step 208, the processor executes the classifier to determine whether the image of the fingerprint captured at step 202 is from a live finger or a spoofed finger. In some embodiments, the spoof detection classifier is executed as part of a fingerprint matcher that compares an input image to enrollment images. In other embodiments, the spoof detection classifier is executed separately from the fingerprint matcher.

Figure 3:
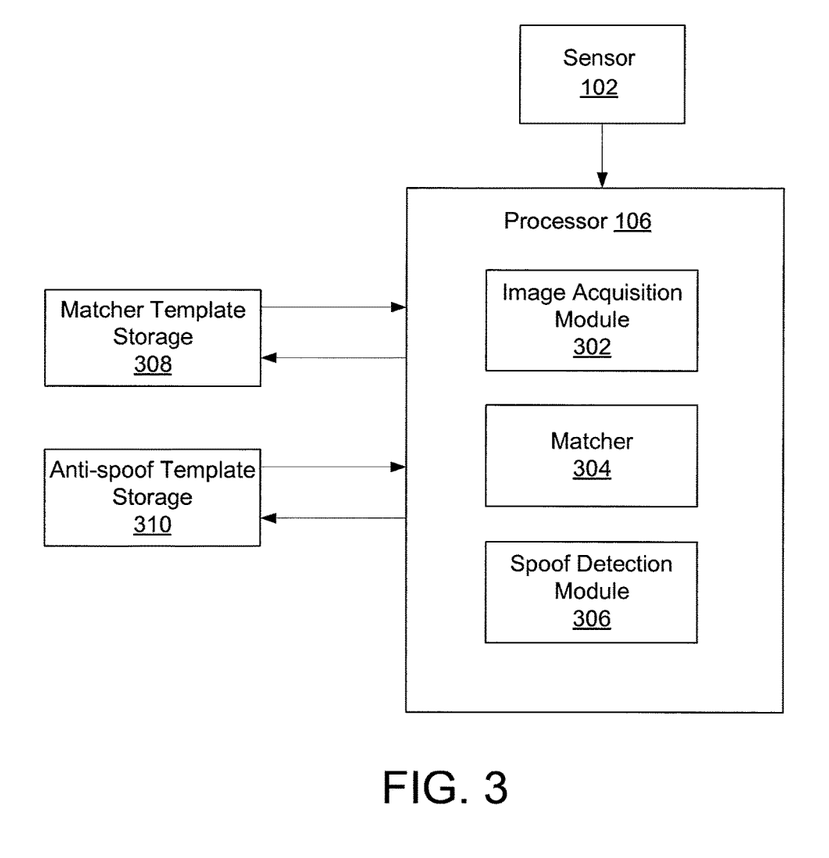
FIG. 3 is a block diagram of a spoof detection system, according to an embodiment.

FIG. 3 is a block diagram of a spoof detection system, according to an embodiment. The system includes a sensor device 102 and a processor 106. The processor 106 is configured to execute one or more software functional blocks, including an image acquisition module 302, a matcher 304, and a spoof detection module 306. The image acquisition module 302, the matcher 304, and the spoof detection module 306 are implemented as software instructions stored in a memory and executed by one or more processors 106. It is understood that each of the functional blocks may be also implemented by dedicated circuitry instead of or in combination with software.

Although shown as separate function blocks in FIG. 3, two or more of the image acquisition module 302, the matcher 304, and the spoof detection module 306 may be executed together as a single software module, application, or operating system. Alternatively, the image acquisition module 302, the matcher 304, and the spoof detection module 306 may be executed separately and/or provided by different software vendors. Also, in some embodiments, multiple processors 106 may be used to execute one or more of the image acquisition module 302, the matcher 304, and the spoof detection module 306.

In some embodiments, an input image, such as a fingerprint image, is captured by the sensor device 102. The input image is passed to the image acquisition module 302, which determines whether the image is an enrollment image or a verification image. If the input image is an enrollment image, a template associated with the input image is stored in a matcher template storage 308 and/or the matcher template storage 308 is updated based on the new input image.

If the input image is a verification image, the image acquisition module 302 also passes the input image to the matcher 304, which is configured to determine whether the input image matches any of the enrollment images stored in the matcher template storage 308. In one implementation, the matcher 304 may compare the input image to the enrollment image to determine a difference between the images. In some embodiments, if the difference is below a threshold, a match is found; otherwise, there is no match. In other embodiments, various techniques other than a comparison to a threshold can be used to determine whether the input image is a match to any of the enrollment images. Many different techniques can be used to execute the matcher 304, including point-based techniques, ridge-based techniques, or a combination of point-based and ridge-based techniques.

In one implementation, before the matcher 304 can compare the input image to the stored enrollment images (or "templates"), the matcher 304 performs alignment. An alignment that most closely aligns the input image to one of the enrollment images is determined, and transformation corresponding to the alignment is applied to the input image. The transformation T can be represented by $T=(T_x, T_y, \theta)$, where $T_x$ is a translation in the horizontal direction, $T_y$ is a translation in the vertical direction, and $\theta$ is a rotation. This process is known as image alignment. Various techniques may be used by the matcher 304 to compute the image alignment.

In one embodiment, after the matcher 304 performs image alignment, the matcher 304 makes a match/non-match decision. In other embodiments, the matcher generates a match score and returns the match score to another entity of the system that called the matcher 304 (e.g., the image acquisition module 302), where the other entity makes the match/non-match decision based on the match score. The match/non-match decision may be based on comparing overlapping regions of the input image and the enrollment image. In one implementation, the matcher 304 may compare the overlapping regions of the aligned input image to the enrollment image to determine a difference between the images. In some embodiments, if the difference is below a threshold, a match is found; otherwise, there is no match. It should be understood that many different techniques can be used for matching and are also within the scope of the disclosure.

In some embodiments, for enrollment images, the image acquisition module 302 also passes the input image to the spoof detection module 306, which may extract anti-spoof metrics from the input image. Example anti-spoof metrics include: an average gray level of ridges, an average gray level of valleys, one or more values as to whether the input image includes blurred areas, one or more values as to whether the input image includes relative lighter areas, one or more values as to whether the input image includes relative darker areas, texture information (for example, by computing LBP (linear binary patterns) on portions of the input image, among others. In some implementations, the anti-spoof metrics may not be discerning enough to provide adequate fingerprint matching results, i.e., since many spoofed images could satisfy a matcher that relied solely on anti-spoof metrics for matching.

The anti-spoof metrics extracted from the input image by the spoof detection module 306 are stored in an anti-spoof template (which can also be referred to as an "anti-spoof enrollment template") in the anti-spoof template storage 310. In some embodiments, the metrics extracted from the input image can be combined with the anti-spoof metrics in the anti-spoof template, for example by averaging the metrics extracted from the input image and the anti-spoof metrics in the anti-spoof template, to generate an updated anti-spoof template. Some embodiments do not store an anti-spoof template, and the spoof/non-spoof decision is based solely on the input image.

In one implementation, the matcher template storage 308 and the anti-spoof template storage 310 comprise one storage device. In another implementation, the matcher template storage 308 and the anti-spoof template storage 310 comprise separate storage devices.

In addition, in one implementation, when a user is enrolling enrollment images, the same images are used for updating the matcher template storage 308 and the anti-spoof template storage 310. In other implementations, separate enrollment processes are used to update the matcher template storage 308 and the anti-spoof template storage 310. As such, a given enrollment image could be used to update just one or both of the matcher template storage 308 and the anti-spoof template storage 310. However, as described, other embodiments do not store any anti-spoof templates, and the spoof/non-spoof decision is based solely on the input image.

In some embodiments, if the matcher 304 does not find a match in the matcher template storage 308, then the matcher 304 takes an appropriate action, such as, for example, denying entry to a mobile device. If the matcher 304 finds a match, then the spoof detection module 306 is configured to determine whether the input image is a spoof of a live finger, i.e., whether image is that of a real live finger or a other non-derma-based material, such as gelatin or wood glue.

In some embodiments, the spoof detection module 306 is executed as part of the matcher 304. In other embodiments, the spoof detection module 306 is executed separately from the matcher 304.

In some embodiments, the spoof detection module 306 is executed after the matcher 304 finds a positive match. In other embodiments, the spoof detection module 306 is executed before the matcher 304 makes a match/non-match decision. In still further embodiments, the spoof detection module 306 and the matcher 304 are executed in parallel.

Also, in some embodiments, the match/non-match decision of the matcher is made by a classifier associated with the matcher, which is the same classifier that makes the spoof/non-spoof decision. In other embodiments, the match/non-match decision is made by a different classifier than the classifier that makes the spoof/non-spoof decision.

Figure 4:
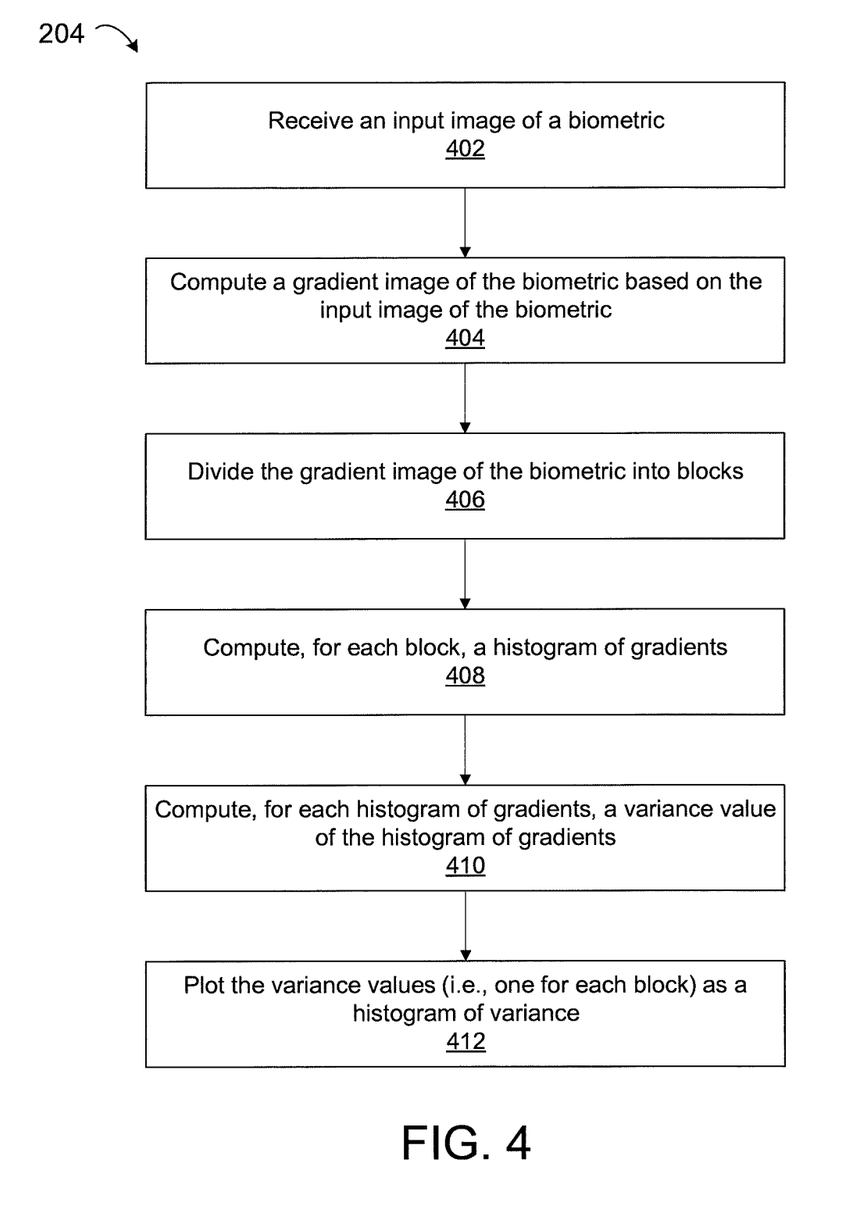
FIG. 4 is a flow diagram illustrating method steps for computing a metric based on a histogram of variance according to an embodiment.

FIG. 4 is a flow diagram illustrating a method for computing a metric based on a histogram of variance according to an embodiment. In one embodiment, the method illustrated in FIG. 4 corresponds to step 204 in FIG. 2.

Figure 5A:
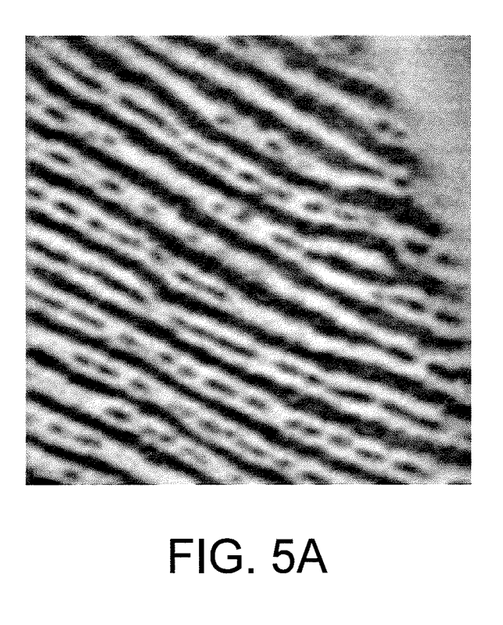
FIG. 5A is an example of a grayscale image of a fingerprint according to an embodiment.

As shown in FIG. 4, at step 402, a processor receives an input image of a biometric (e.g., the image captured at step 202 in FIG. 2). In one implementation, the input image is a grayscale image of a fingerprint. An example of a grayscale image of a fingerprint is shown in FIG. 5A.

Figure 5B:
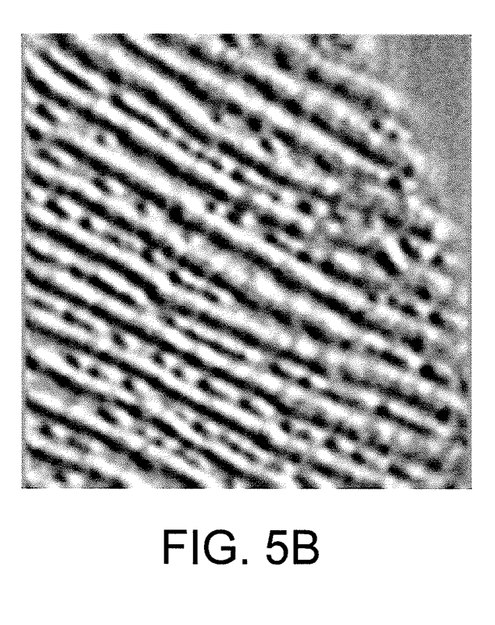
FIG. 5B is an example of a gradient image of a fingerprint according to an embodiment.

At step 404, the processor computes a gradient image of the biometric based on the input image of the biometric. An example of a gradient image of a fingerprint is shown in FIG. 5B. An image gradient is a directional change in the intensity or color in an image. In one implementation, computing the gradient involves taking an X-Y grid on a flat surface, where the function $f(x,y)$ is the height of the surface of interest above the flat surface. The gradient is related to the slope of the surface at each point. The direction of the gradient is the direction of the greatest uphill slope. The size of the gradient is the amount of the slope in that direction. Thus, the gradient function creates a vector from a scalar quantity. The gradient can be represented using the symbol $\nabla f(x,y)$ and can be defined by:

$$\Delta f(x, y) = \left(\frac{d}{dx} f(x, y), \frac{d}{dy} f(x, y)\right)$$

The direction of the gradient is defined using the unit vector calculation:

$$\frac{\nabla f(x, y)}{\|\nabla f(x, y)\|}$$

The magnitude of the gradient is the length of the gradient vector:

$$\|\nabla f(x,y)\|$$

In other implementations, any technically feasible solution may be used to compute the gradient image. For example, computing the gradient image may include computing a first order derivative of fingerprint ridges (as opposed to fingerprint valleys) included in the grayscale image of the fingerprint.

Figure 6:
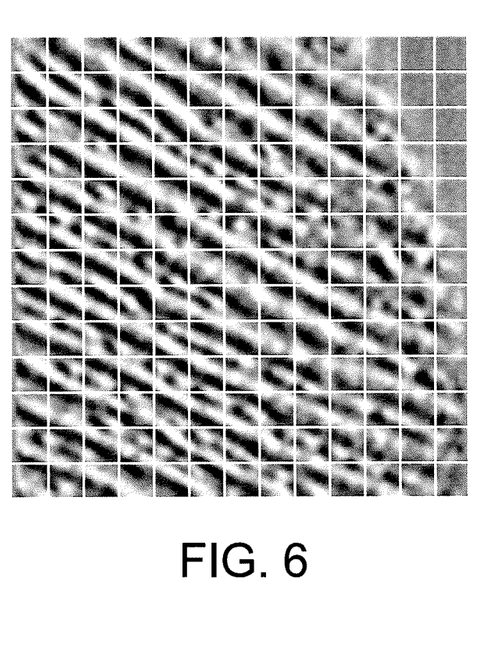
FIG. 6 illustrates an example of a gradient image with a grid superimposed thereon to show division of the gradient image into blocks according to an embodiment.

At step 406, the processor divides the gradient image of the biometric into blocks. In one implementation, the blocks are square-shaped blocks of non-overlapping pixels. For example, the gradient image can be divided into 8×8 pixel blocks. In some implementations, the size of the blocks may depend on the size (i.e., dimensions) of the input image. In other implementations, the size of the blocks may be fixed, regardless of the size of the input image. FIG. 6 illustrates an example of a gradient image with a grid superimposed thereon to show division of the gradient image into blocks.

Figure 7:
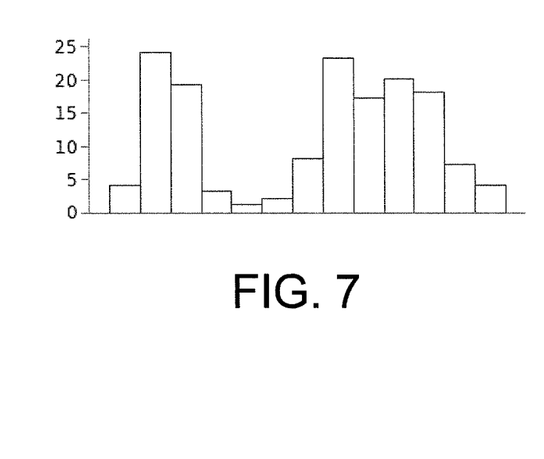
FIG. 7 illustrates a histogram of gradients of one block of a gradient image according to an embodiment.

At step 408, the processor computes, for each block, a histogram of gradients. In one implementation, the processor examines, for a given block, each pixel in the given block and determines a gradient value for the pixel. The gradient values are binned into a histogram of gradients for the given block, as shown in the example histogram in FIG. 7. A histogram of gradients (like the one shown in FIG. 7) is computed for each block of the gradient image of the biometric. In some implementations, an explicit "histogram" is not necessarily computed; rather, the gradient values are simply computed for each pixel. In such embodiments, a histogram is used for illustration purposes and for ease of understanding the disclosed technique.

Figure 8:
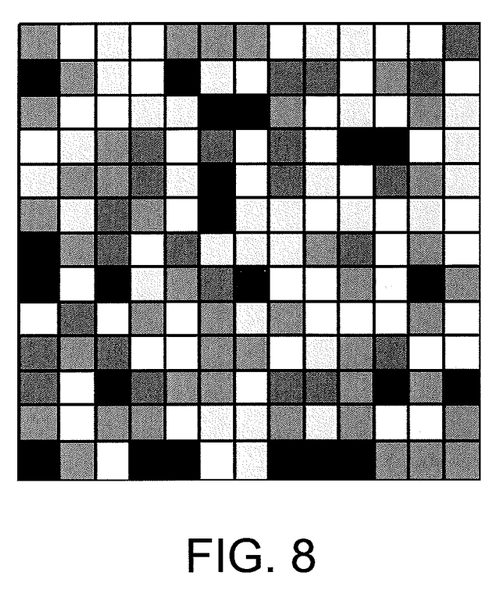
FIG. 8 is an illustration of the variance values computed for various blocks of a gradient image according to an embodiment.

At step 410, the processor computes, for each histogram of gradients, a variance value of the histogram of gradients. In general, "variance" measures how far a set of numbers are spread out from their mean. For example, variance of a set of numbers can be computed as the expectation of the squared deviation of a random variable from its mean. FIG. 8 is an illustration of the variance values computed for the various blocks of a gradient image, according to one embodiment. In FIG. 8, a lighter color square corresponding to a block of the gradient image corresponds to a relatively lower variance value, and a darker color square corresponds to a relatively greater variance value.

Figure 9:
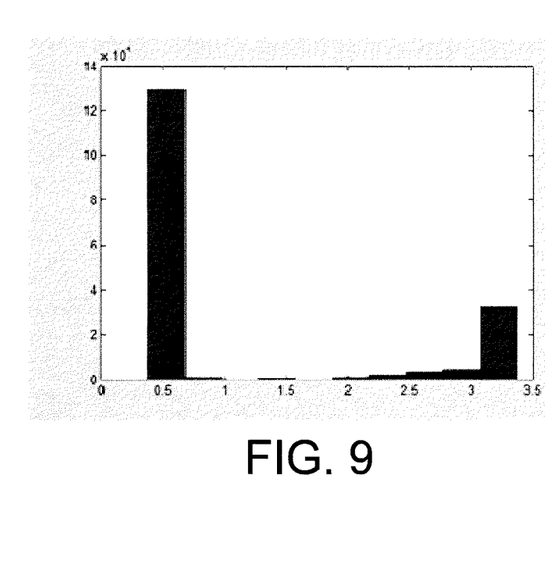
FIGS. 9 and 10 illustrate example histograms of variance according to certain embodiments.
Figure 10:
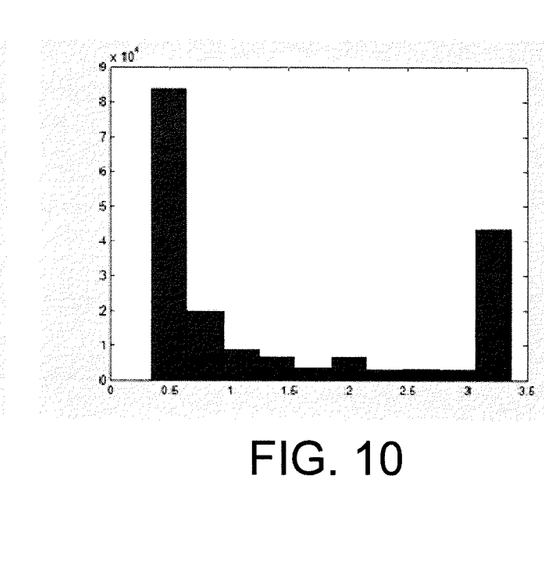

At step 412, the processor plots the variance values as a histogram of variance. Each variance value corresponds to a different block of the gradient image. FIGS. 9 and 10 illustrate example histograms of variance. FIG. 9 is a histogram of variance for a live fingerprint, and FIG. 10 is a histogram of variance for a spoofed fingerprint. Note that the live fingerprint represented in FIG. 9 has more blocks with low variance and, hence, the histogram is skewed toward the left. The spoof fingerprint represented in FIG. 10 has more blocks with higher variance and, as result, the histogram is skewed toward the right. In some implementations, the x-axis in the histogram of variance is fixed, which makes the histogram independent of image size (i.e., dimensions of the image). The histogram of variance can be normalized and used a metric that is input to a classier. In some implementations, additional metrics to measure the histogram difference, such as Earth Movers Distance (EMD) or chi-square distance, can also be input to the classifier or used as direct measures of difference. In some implementations, an explicit "histogram" of variance is not necessarily computed; rather, the variance values are simply computed for each pixel. The histogram of variance, therefore, can be used for illustration purposes.

Figure 11:
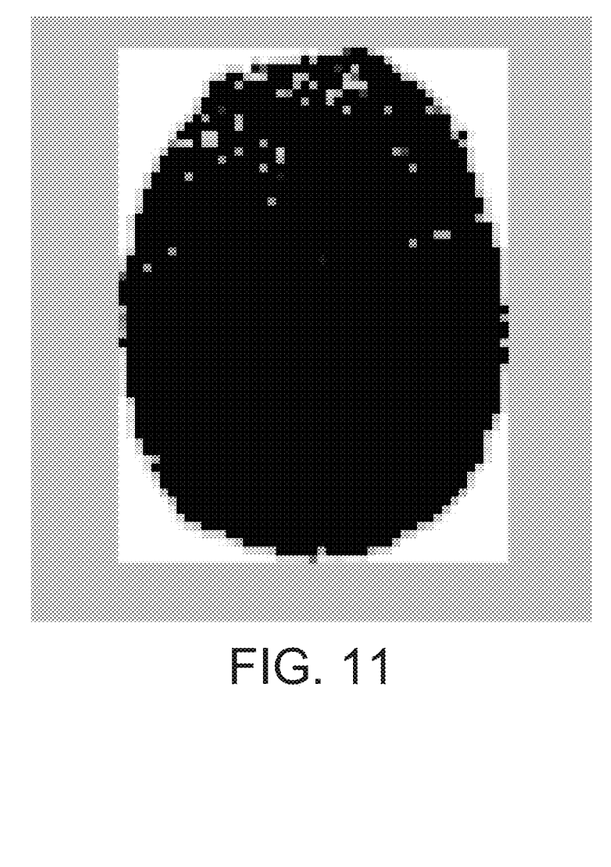
FIGS. 11 and 12 illustrate variance values in a histogram of gradients for each block of sample fingerprints according to certain embodiments.
Figure 12:
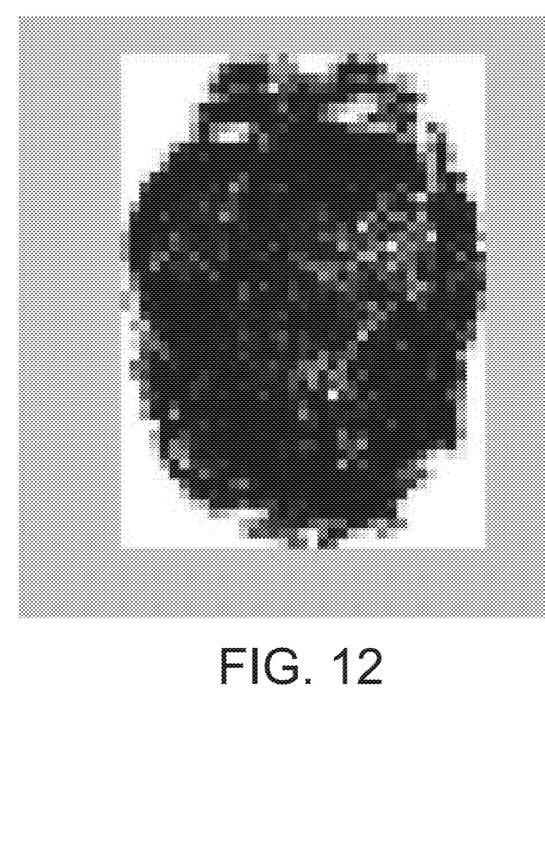

FIGS. 11 and 12 illustrate variance values in a histogram of gradients for each block of sample fingerprints. FIG. 11 illustrates a live fingerprint and FIG. 12 illustrates a spoofed fingerprint. The image in FIG. 11 corresponds to the histogram of variance in FIG. 9, and the image in FIG. 12 corresponds to the histogram of variance in FIG. 10. As can be seen, there is significant variance in the spoof fingerprint image, as compared to the live fingerprint image.

In some implementations, the variance values are input to a classifier configured to determine whether an image is a spoof. In one embodiment, the classifier is configured to make a spoof/non-spoof decision based on an overall liveness score that is computed by the classifier based on the combination of metrics. In another embodiment, the classifier is configured to generate the overall liveness score and return the overall liveness score to another entity within the anti-spoof module that makes the spoof/non-spoof decision, e.g., by comparing the anti-spoof score to a threshold.

Some classifiers may require a fixed number of features. For a smaller image, there could be a lesser number of blocks as compared to a larger image, leading to a different number of histograms. To overcome this obstacle, the block size can be adjusted with the image size so that the number of histograms of gradients can be kept constant. This has the drawback that variance in the histogram becomes a less distinguishing metric, as larger blocks fail to capture the subtle changes in orientation. Therefore, some embodiments can create a histogram of variances with a fixed number of bins (e.g., 32 bins), which would provide a metric that is image size independent.

Although this invention describes optical object imaging in the context of fingerprint image sensing, the method and system may be used to image any object.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for spoof detection, comprising:
   receiving an input image of a biometric;
   computing a gradient image of the biometric based on the input image of the biometric, wherein each pixel of the gradient image represents a value for a directional change in a characteristic at a corresponding pixel location in the input image;
   dividing the gradient image into blocks of pixels;
   computing, for each block of pixels, a set of gradient values, wherein each gradient value in the set of gradient values for a given block corresponds to a gradient value of a different pixel of the gradient image in the given block;
   computing, for each block of pixels, a variance value, wherein the variance value for a given block corresponds to a variance of the gradient values in the set of gradient values for the given block; and
   determining whether the input image is a replica of the biometric based on the variance values of the blocks of pixels of the gradient image.

2. The method of claim 1, wherein each block corresponds to a non-overlapping set of pixels of the gradient image.

3. The method of claim 1, wherein the input image comprises a grayscale image of a fingerprint, and computing the gradient image comprises computing a first order derivative of fingerprint ridges included in the grayscale image of the fingerprint.

4. The method of claim 1, wherein the blocks comprise square-shaped blocks of pixels.

5. The method of claim 1, wherein after computing, for each block of pixels, the set of gradient values, the method further comprises:
   computing, for each block of pixels, a histogram of the gradient values in the set of gradient values of the pixels in the block.

6. The method of claim 5, further comprising:
   plotting the variance values as a histogram of variance.

7. The method of claim 1, wherein a user is denied access to a device based on determining that the input image is a replica of the biometric.

8. The method of claim 1, wherein the gradient image is divided into a fixed number of blocks regardless of dimensions of the input image.

9. The method of claim 1, wherein the biometric comprises a fingerprint of a finger, and the replica comprises a gelatin mold, a graphite mold, or a wood glue mold of the fingerprint of the finger.

10. The method of claim 1, wherein the biometric comprises a fingerprint of a finger, and computing the gradient image comprises computing a first order derivative of fingerprint ridges included in the fingerprint of the finger.

11. A non-transitory computer-readable storage medium storing instructions that, when executed by a processor, causes a computing device to perform spoof detection, by performing steps comprising:
    receiving an input image of a biometric;
    computing a gradient image of the biometric based on the input image of the biometric, wherein each pixel of the gradient image represents a value for a directional change in a characteristic at a corresponding pixel location in the input image;
    dividing the gradient image into blocks of pixels;
    computing, for each block of pixels, a set of gradient values, wherein each gradient value in the set of gradient values for a given block corresponds to a gradient value of a different pixel of the gradient image in the given block;
    computing, for each block of pixels, a variance value, wherein the variance value for a given block corresponds to a variance of the gradient values in the set of gradient values for the given block; and
    determining whether the input image is a replica of the biometric based on the variance values of the blocks of pixels of the gradient image.

12. The computer-readable storage medium of claim 11, wherein each block corresponds to a non-overlapping set of pixels of the gradient image.

13. The computer-readable storage medium of claim 11, wherein the input image comprises a grayscale image of a fingerprint, and computing the gradient image comprises computing a first order derivative of fingerprint ridges included in the grayscale image of the fingerprint.

14. The computer-readable storage medium of claim 11, wherein after computing, for each block of pixels, the set of gradient values, the steps further comprise:
    computing, for each block of pixels, a histogram of the gradient values in the set of gradient values of the pixels in the block.

15. The computer-readable storage medium of claim 11, wherein a user is denied access to a device based on determining that the input image is a replica of the biometric.

16. The computer-readable storage medium of claim 11, wherein the gradient image is divided into a fixed number of blocks regardless of dimensions of the input image.

17. The computer-readable storage medium of claim 11, wherein the biometric comprises a fingerprint of a finger, and the replica comprises a gelatin mold, a graphite mold, or a wood glue mold of the fingerprint of the finger.

18. The computer-readable storage medium of claim 11, wherein the biometric comprises a fingerprint of a finger, and computing the gradient image comprises computing a first order derivative of fingerprint ridges included in the fingerprint of the finger.

19. A device, comprising:
    a biometric sensor; and
    a processor configured to:
        receive, from the biometric sensor, an input image of a biometric;
        compute a gradient image of the biometric based on the input image of the biometric, wherein each pixel of the gradient image represents a value for a directional change in a characteristic at a corresponding pixel location in the input image;
        divide the gradient image into blocks of pixels;
        compute, for each block of pixels, a set of gradient values, wherein each gradient value in the set of gradient values for a given block corresponds to a gradient value of a different pixel of the gradient image in the given block;
        compute, for each block of pixels, a variance value, wherein the variance value for a given block corresponds to a variance of the gradient values in the set of gradient values for the given block; and
        determine whether the input image is a replica of the biometric based on the variance values of the blocks of pixels of the gradient image.

20. The method of claim 1, wherein the characteristic comprises intensity or color at the corresponding pixel location in the input image.

* * * * *